United States Patent
Ide et al.

(10) Patent No.: US 12,512,774 B2
(45) Date of Patent: Dec. 30, 2025

(54) MOTOR CONTROL APPARATUS

(71) Applicant: SANYO DENKI CO., LTD., Tokyo (JP)

(72) Inventors: Yuji Ide, Tokyo (JP); Michio Kitahara, Tokyo (JP); Shunichi Miyazaki, Tokyo (JP); Yoshiyuki Usui, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 173 days.

(21) Appl. No.: 18/437,764

(22) Filed: Feb. 9, 2024

(65) Prior Publication Data
US 2024/0305228 A1    Sep. 12, 2024

(30) Foreign Application Priority Data
Mar. 10, 2023   (JP) ................. 2023-037514

(51) Int. Cl.
| | |
|---|---|
| H02P 21/00 | (2016.01) |
| H02M 7/48 | (2007.01) |
| H02P 21/30 | (2016.01) |
| H02P 27/08 | (2006.01) |

(52) U.S. Cl.
CPC ...... *H02P 21/0089* (2013.01); *H02M 7/4803* (2021.05); *H02P 21/30* (2016.02); *H02P 27/08* (2013.01)

(58) Field of Classification Search
CPC .......... H02P 29/02; H02P 27/08; H02P 21/22; H02P 21/0089; H02P 21/30; H02M 7/53871; H02M 1/325; H02M 5/458; H02M 7/4803
See application file for complete search history.

(56) References Cited

U.S. PATENT DOCUMENTS

| | | | | |
|---|---|---|---|---|
| 6,965,212 | B1* | 11/2005 | Wang | .............. H02P 21/06 318/700 |
| 2016/0028331 | A1* | 1/2016 | Hashimoto | ........... H02P 29/025 318/479 |
| 2017/0250643 | A1* | 8/2017 | Ikai | ............. H02P 29/025 |

FOREIGN PATENT DOCUMENTS

| | | |
|---|---|---|
| JP | H06-165579 A | 6/1994 |
| JP | H11-308894 A | 11/1999 |

* cited by examiner

*Primary Examiner* — Said Bouziane
(74) *Attorney, Agent, or Firm* — Rankin, Hill & Clark LLP

(57) ABSTRACT

A motor control apparatus includes: a smoothing capacitor; an inverter circuit; a torque limiter; and a field-weakening control device. The smoothing capacitor smooths the direct current power. The inverter circuit converts the smoothed direct current power to alternating current power. The torque limiter limits motor torque based on a torque limit value calculated from a direct current voltage applied to the smoothing capacitor, limiting the motor torque in a power running direction to a first torque value when the direct current voltage drops to a first threshold. The field-weakening control device weakens a field and raises an induced motor voltage and the direct current voltage when the power running direction motor torque is limited to the first value. The torque limiter limits the power running direction motor torque to a second value greater than the first value when the direct current voltage rises from the first to a second threshold.

8 Claims, 8 Drawing Sheets

MOTOR CONTROL APPARATUS

CROSS-REFERENCE TO RELATED APPLICATION

This application is based on Japanese Patent Application No. 2023-037514 filed with the Japan Patent Office on Mar. 10, 2023, the entire content of which is hereby incorporated by reference.

BACKGROUND

1. Technical Field

The present disclosure relates to a motor control apparatus.

2. Related Art

Generally, when a momentary power interruption occurs in an alternating current power supply during power running operation of a motor of a motor control apparatus, power is supplied to the motor from a smoothing capacitor through an inverter. At this point in time, when the voltage across the smoothing capacitor drops below a voltage at which the motor can be driven, a voltage anomaly is detected. The motor then stops. Hence, factory lines stop, which decreases the capacity utilization rate of the factory.

According to, for example, an inverter control method disclosed in JP-A-06-165579, a first, second, and a third threshold are set for a direct current voltage across an inverter. The degree of drop in voltage increases sequentially in the order of the first, the second, and the third threshold. In the control method described in JP-A-06-165579, when the direct current voltage that has dropped due to the occurrence of a power interruption in a power supply falls to or below the second threshold, an electric motor decelerates in response to an operation command signal to the inverter. When the direct current voltage that has increased due to power regeneration involved with the deceleration exceeds the first threshold, an operation command signal causes the electric motor to accelerate. Deceleration control and acceleration control are subsequently repeated in response to operation command signals, so that a reduction in the drop rate of the direct current voltage can be encouraged. In addition, when the direct current voltage exceeds the third threshold, the operation of the electric motor by the inverter can be continued.

Moreover, according to a processing method at the time of a power interruption in an electric motor, which is disclosed in JP-A-11-308894, when a direct current voltage falls below a power interruption detection level voltage VU2 during operation of the electric motor, the electric motor is decelerated. When the direct current voltage reaches between an allowable lower limit voltage VU0 and the power interruption detection level voltage VU2, then acceleration/deceleration stops. The speed of the electric motor then becomes constant. As a result, when the direct current voltage exceeds the allowable lower limit voltage VU0, normal control is recovered.

However, in the methods described in JP-A-06-165579 and JP-A-11-308894, the deceleration of the motor leads to an increase in the direct current voltage. Hence, there arises a problem that the amount of reduction in the speed of the motor is large. In other words, when the amount of reduction in speed is large, the acceleration time extends. Therefore, the capacity utilization rate of the factory decreases.

Hence, the present disclosure provides a motor control apparatus that can suppress a drop in direct current voltage with a small amount of reduction in the speed of a motor. According to the motor control apparatus, it is possible to avoid occurrence of an anomaly and to shorten the extension of the acceleration time due to a momentary power interruption.

SUMMARY

A motor control apparatus according to an embodiment of the present disclosure includes a converter circuit; a smoothing capacitor; an inverter circuit; a torque limiter; and a field-weakening control device, in which the converter circuit is configured to convert alternating current power from an alternating current power supply to direct current power, the smoothing capacitor is configured to smooth the direct current power, the inverter circuit is configured to convert the smoothed direct current power to alternating current power for driving a motor, the torque limiter is configured to limit torque on the motor based on a torque limit value calculated from a direct current voltage to be applied to the smoothing capacitor, the torque limiter is configured to limit torque in a power running direction on the motor to a first torque value upon the direct current voltage dropping to a first threshold, the field-weakening control device is configured to weaken a field and raise an induced voltage of the motor to raise the direct current voltage upon the torque in the power running direction being limited to the first torque value, and the torque limiter is configured to limit the torque in the power running direction on the motor to a second torque value greater than the first torque value upon the direct current voltage rising from the first threshold to a second threshold greater than the first threshold.

DETAILED DESCRIPTION

Figure 1:
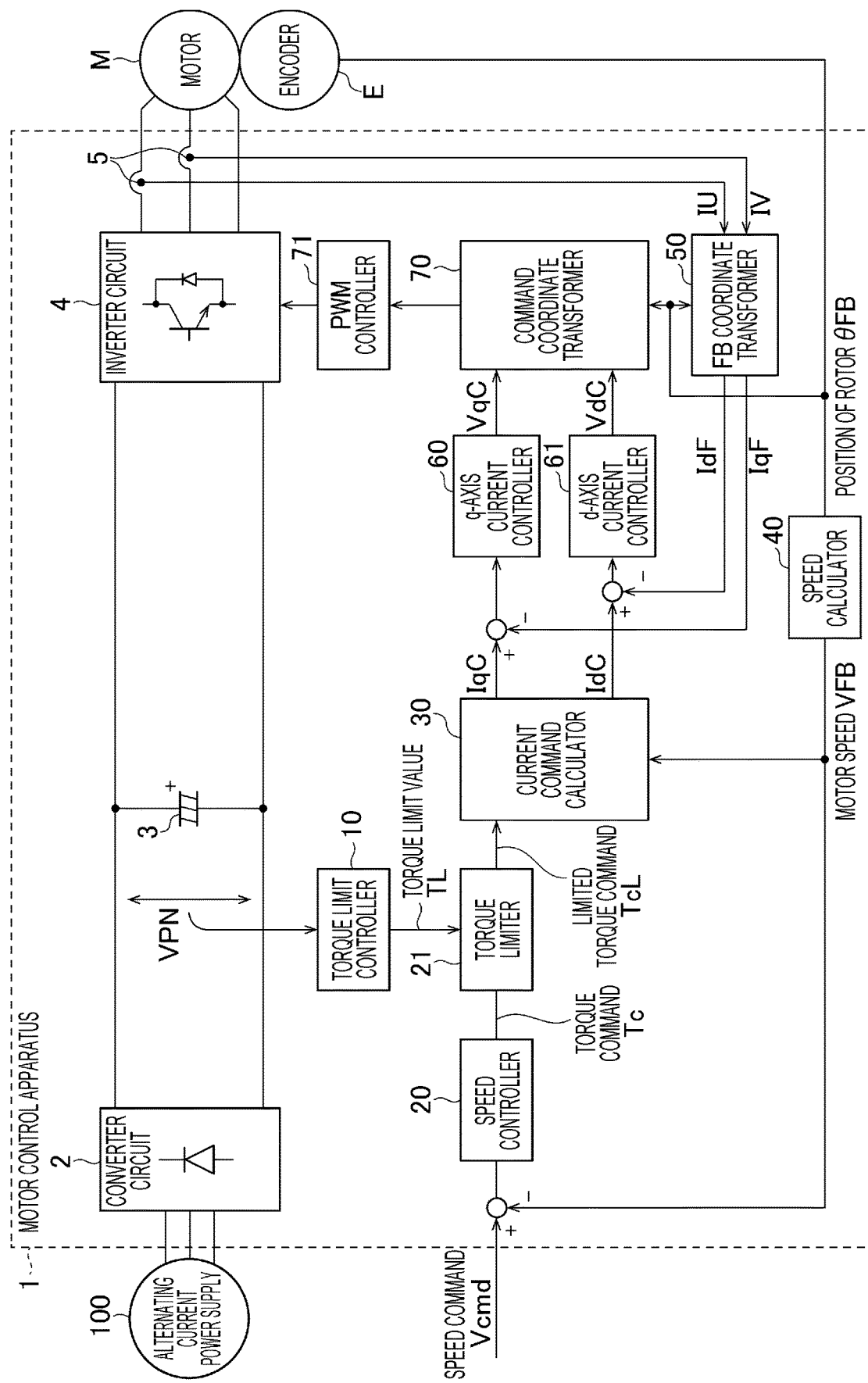
FIG. 1 is a block diagram of a motor control apparatus according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A motor control apparatus according to one aspect of the present disclosure includes a converter circuit; a smoothing capacitor; an inverter circuit; a torque limiter; and a field-weakening control device, in which the converter circuit is configured to convert alternating current power from an alternating current power supply to direct current power, the smoothing capacitor is configured to smooth the direct current power, the inverter circuit is configured to convert the smoothed direct current power to alternating current power for driving a motor, the torque limiter is configured to limit torque on the motor based on a torque limit value calculated from a direct current voltage to be applied to the smoothing capacitor, the torque limiter is configured to limit torque in a power running direction on the motor to a first torque value upon the direct current voltage dropping to a first threshold, the field-weakening control device is configured to weaken a field and raise an induced voltage of the motor to raise the direct current voltage upon the torque in the power running direction being limited to the first torque value, and the torque limiter is configured to limit the torque in the power running direction on the motor to a second torque value greater than the first torque value upon the direct current voltage rising from the first threshold to a second threshold greater than the first threshold.

A motor control apparatus according to another aspect of the present disclosure includes a converter circuit; a smoothing capacitor; an inverter circuit; a torque limiter; and a field-weakening limiter, in which the converter circuit is configured to convert alternating current power from an alternating current power supply to direct current power, the smoothing capacitor is configured to smooth the direct current power, the inverter circuit is configured to convert the smoothed direct current power to alternating current power for driving a motor, the torque limiter is configured to limit torque on the motor based on a direct current voltage to be applied to the smoothing capacitor, the field-weakening limiter is configured to limit field-weakening based on the direct current voltage to be applied to the smoothing capacitor, the torque limiter is configured to limit torque in a power running direction on the motor to a first torque value upon the direct current voltage dropping to a first threshold, the field-weakening limiter is configured to limit the field-weakening to a first field-weakening value and raise an induced voltage of the motor to raise the direct current voltage upon the direct current voltage dropping to the first threshold, the torque limiter is configured to limit the torque in the power running direction on the motor to a second torque value greater than the first torque value upon the direct current voltage rising from the first threshold to a second threshold greater than the first threshold, and the field-weakening limiter is configured to limit the field-weakening to a second field-weakening value greater than the first field-weakening value upon the direct current voltage rising from the first threshold to the second threshold greater than the first threshold.

According to the embodiments, it is possible to suppress a drop in direct current voltage with a small amount of reduction in motor speed and avoid occurrence of an anomaly. Consequently, it is possible to provide a motor control apparatus that can shorten the acceleration time due to a momentary power interruption.

The embodiments are described hereinafter with reference to the drawings. Note that the descriptions of elements having the same reference numerals as those of elements that have already been described are omitted in the detailed description for the sake of convenience.

First Embodiment

FIG. 1 is a block diagram of a motor control apparatus 1 according to a first embodiment of the present disclosure. As illustrated in FIG. 1, the motor control apparatus 1 includes a converter circuit 2, a smoothing capacitor 3, and an inverter circuit 4. Moreover, the motor control apparatus 1 includes a torque limit controller 10, a speed controller 20, a torque limiter 21, a current command calculator 30, a speed calculator 40, a current detector 5, a feedback (FB) coordinate transformer 50, a q-axis current controller 60, a d-axis current controller 61, a command coordinate transformer 70, and a PWM controller 71.

The converter circuit 2 is a three-phase (phases r, s, and t) full bridge circuit. The converter circuit 2 includes six rectifier diodes. The converter circuit 2 converts a three-phase alternating current that is inputted from an alternating current power supply 100 to direct current.

The smoothing capacitor 3 is, for example, an electrolytic capacitor. The smoothing capacitor 3 smooths and stores the direct current that is outputted by the converter circuit 2.

The inverter circuit 4 is a three-phase (phases u, v, and w) full bridge circuit. The inverter circuit 4 includes six semiconductor switching elements. Each of the semiconductor switching elements includes, for example, an IGBT and an anti-parallel freewheeling diode. In the inverter circuit 4, the PWM controller 71 drives the six semiconductor switching elements. Consequently, the direct current from the smoothing capacitor 3, or the direct current that is outputted by the converter circuit 2, is converted to a three-phase alternating current for driving a motor. The three-phase alternating current is supplied to a motor M.

An encoder E mounted on the motor M detects a position θFB of a rotor of the motor M. The detected position θFB of the rotor is inputted into the speed calculator 40. The speed calculator 40 differentiates the detected position θFB of the rotor to calculate a motor speed VFB.

A deviation between a speed command Vcmd and the motor speed VFB is inputted into the speed controller 20. The speed controller 20 calculates and outputs a torque command TC.

A direct current voltage VPN that is applied to the smoothing capacitor 3 is inputted into the torque limit controller 10. The torque limit controller 10 calculates and outputs a torque limit value TL. A method for calculating the torque limit value TL is described below.

The speed controller 20 inputs the torque command Tc into the torque limiter 21. The torque limit controller 10 also inputs the torque limit value TL into the torque limiter 21. The torque limiter 21 calculates and outputs a torque-limited torque command TcL.

The torque limiter 21 inputs the torque-limited torque command TcL into the current command calculator 30. The current command calculator 30 calculates and outputs a q-axis current command IqC and a d-axis current command IdC.

A deviation between the q-axis current command IqC from the current command calculator 30 and a q-axis current feedback IqF from the feedback coordinate transformer 50 is inputted into the q-axis current controller 60. The q-axis current controller 60 calculates a q-axis voltage command VqC from the inputted deviation, and outputs the q-axis voltage command VqC.

Similarly, a deviation between the d-axis current command IdC from the current command calculator 30 and a d-axis current feedback IdF from the feedback coordinate transformer 50 is inputted into the d-axis current controller 61. The d-axis current controller 61 calculates a d-axis voltage command VdC from the inputted deviation, and outputs the d-axis voltage command VdC.

The q-axis voltage command VqC and the d-axis voltage command VdC are inputted into the command coordinate transformer 70. The command coordinate transformer 70 performs a coordinate transformation from a dq rotating coordinate system to a three-phase stationary coordinate system, on the q-axis voltage command VqC and the d-axis voltage command VdC, based on the position θFB of the rotor, and calculates three-phase voltage commands VUC, VVC, and VWC. The three-phase voltage commands VUC, VVC, and VWC are inputted into the PWM controller 71. The PWM controller 71 generates PWM control signals from the inputted three-phase voltage commands VUC, VVC, and VWC, and outputs the PWM control signals. The PWM control signals are then inputted into the six semiconductor switching elements of the inverter circuit 4. Therefore, PWM control is performed on the inverter circuit 4. In this manner, the drive of the motor M is controlled.

The current detector 5 detects a U-phase motor current IU and V-phase motor current IV of the motor M. The detected current value of the motor current IU and the detected current value of the motor current IV are inputted into the feedback coordinate transformer 50. The feedback coordinate transformer 50 performs a coordinate transformation from the three-phase stationary coordinate system to the dq rotating coordinate system, on the detected current values of the motor currents IU and IV, based on the position θFB of the rotor to calculate the q-axis current feedback IqF and the d-axis current feedback IdF.

Figure 2:
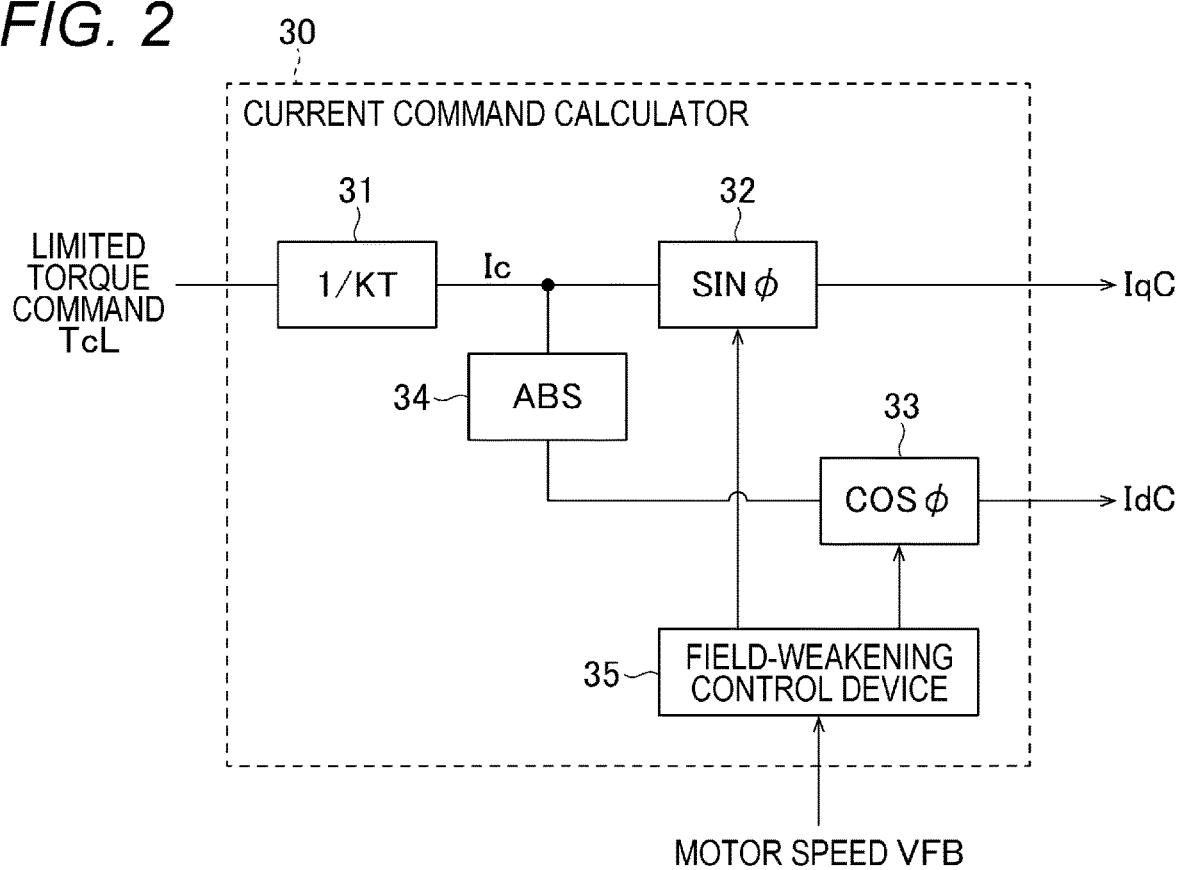
FIG. 2 is a block diagram of a current command calculator that is used in the first embodiment of the present disclosure.

FIG. 2 is a block diagram of the current command calculator 30 that is used in the first embodiment of the present disclosure. As illustrated in FIG. 2, the current command calculator 30 includes a torque constant divider 31 (1/KT), a SIN multiplier 32 (SINΦ), a COS multiplier 33 (COS), an absolute value computing device 34 (ABS), and a field-weakening control device 35.

The torque limiter 21 inputs the torque-limited torque command TcL into the torque constant divider 31. The torque constant divider 31 divides the limited torque command TcL by a torque constant TK to calculate a current command Ic. The calculated current command Ic is inputted into the SIN multiplier 32. Moreover, the calculated current command Ic is inputted into the absolute value computing device 34. The absolute value computing device 34 calculates an absolute value |Ic| of the inputted current command Ic. The calculated absolute value |Ic| is inputted into the COS multiplier 33.

The motor speed VFB is inputted into the field-weakening control device 35. The field-weakening control device 35 calculates an electric angle ϕ between a d-axis and the current command Ic. The calculated electric angle ¢ is inputted into the SIN multiplier 32 and the COS multiplier 33.

The SIN multiplier 32 calculates the q-axis current command IqC by use of the following equation (1) based on the inputted current command Ic and the electric angle ϕ calculated by the field-weakening control device 35, and outputs the q-axis current command IqC.

$$IqC = Ic \times \text{SIN}\phi \quad (1)$$

Similarly, the COS multiplier 33 calculates the d-axis current command IdC by use of the following equation (2) based on the inputted absolute value |Ic| and the electric angle ϕ calculated by the field-weakening control device 35, and outputs the d-axis current command IdC.

$$IdC = |Ic| \times \text{COS}\phi \quad (2)$$

Figure 3:
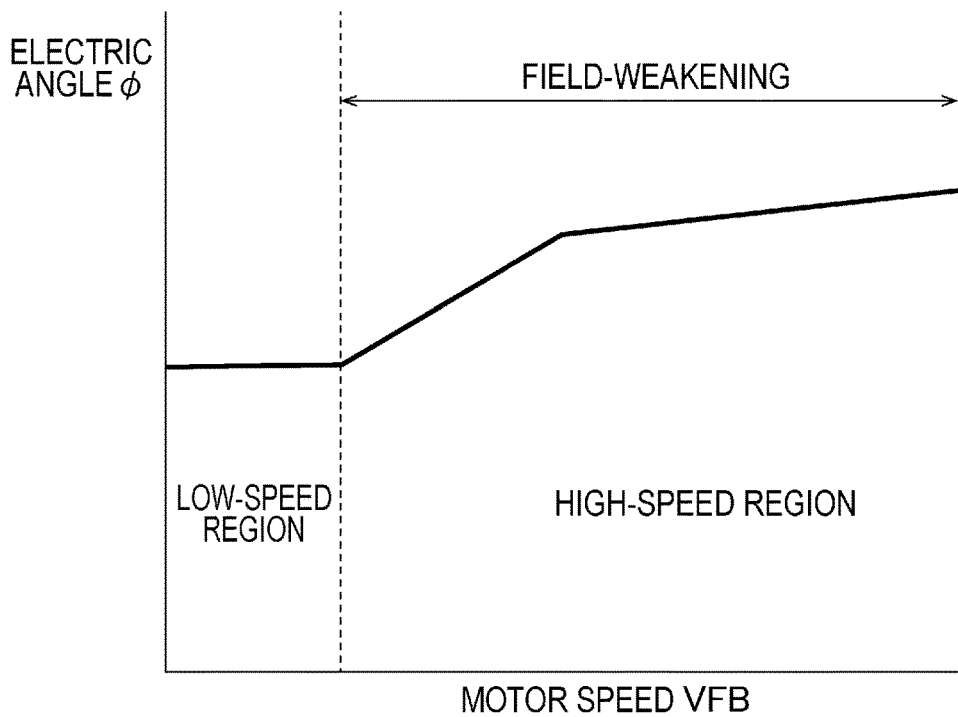
FIG. 3 is a graph illustrating a relationship between a motor speed and an electric angle $\phi$.

FIG. 3 is a graph illustrating a relationship between the motor speed VFB and the electric angle ϕ. The vertical axis indicates the electric angle ϕ. The horizontal axis indicates the motor speed VFB. As illustrated in FIG. 3, in a low-speed region of the motor speed VFB, the electric angle ϕ is adjusted in accordance with the current command Ic to obtain a second torque value TP being the maximum torque of the motor M. Moreover, in a high-speed region of the motor speed VFB, the field-weakening control device 35 increases the electric angle ϕ in accordance with the motor speed VFB in such a manner that the motor voltage to be applied to the motor M is equal to or less than the output voltage of the inverter circuit 4, to implement field-weakening control.

Figure 4:
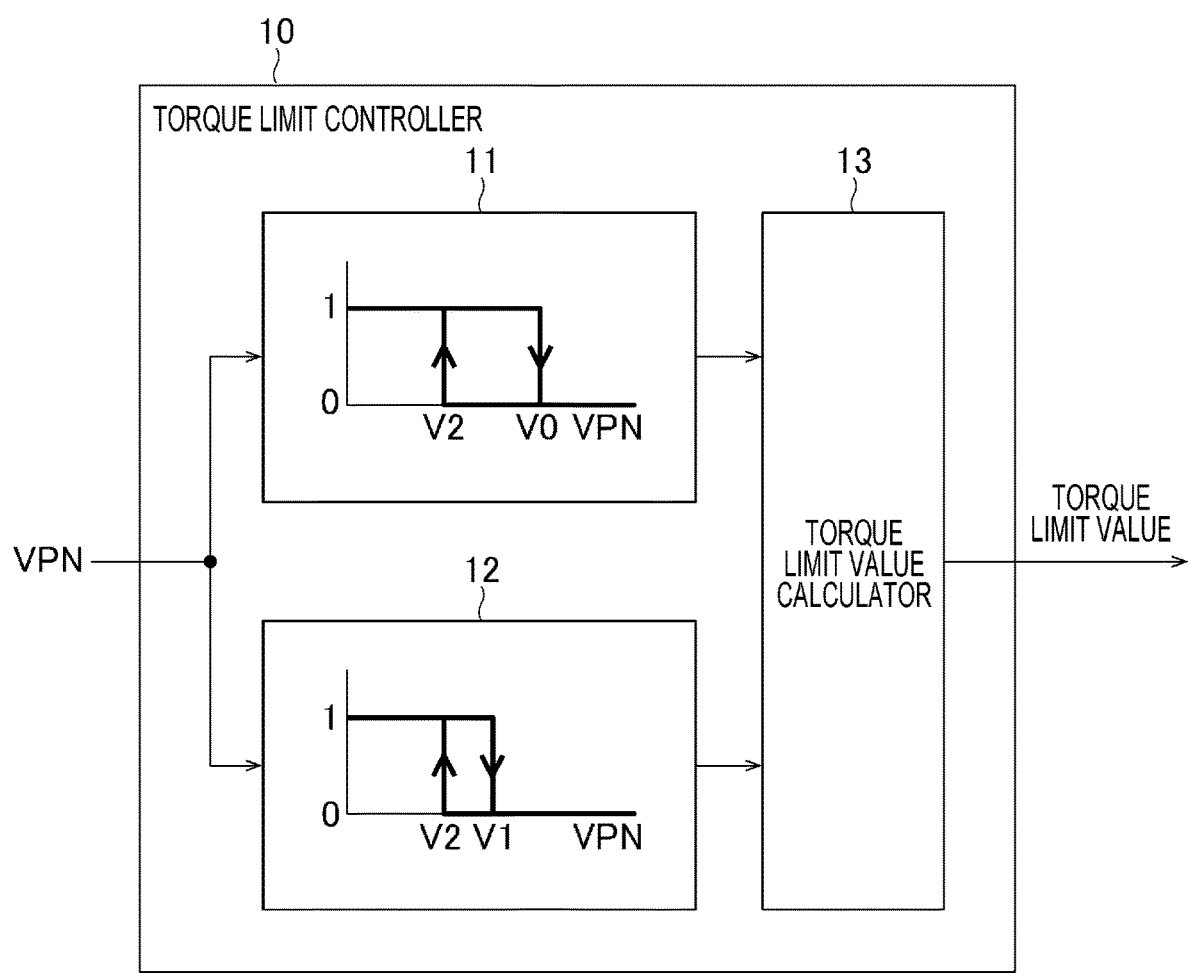
FIG. 4 is a block diagram of a torque limit controller that is used in the first embodiment of the present disclosure.

FIG. 4 is a block diagram of the torque limit controller 10 that is used in the first embodiment of the present disclosure. The internal configuration of the torque limit controller 10 and the method for calculating the torque limit value TL are described by use of FIG. 4.

The torque limit controller 10 includes a first hysteresis comparator 11, a second hysteresis comparator 12, and a torque limit value calculator 13.

The first hysteresis comparator 11 has two thresholds V0 and V2. The second hysteresis comparator 12 has two thresholds V1 and V2. The threshold V2 is set at a value a little higher than an abnormal dropped voltage of the direct current voltage VPN. The abnormal dropped voltage indicates a specified range of voltage values predetermined to detect an abnormal state in which the direct current voltage VPN is lower than a voltage at which the motor M can be driven. Moreover, the threshold V1 is set at a value higher than the threshold V2. The threshold V0 is set at a value higher than the threshold V1.

The first hysteresis comparator 11 outputs one when the direct current voltage VPN is equal to or less than the threshold V2, and outputs zero when the direct current voltage VPN exceeds the threshold V0. Furthermore, the first hysteresis comparator 11 outputs one when the direct current voltage VPN exceeds the threshold V0 and then drops to or below the threshold V2. Similarly, the second hysteresis comparator 12 outputs one when the direct current voltage VPN is equal to or less than the threshold V2, and outputs zero when the direct current voltage VPN exceeds the threshold V1. Furthermore, the second hysteresis comparator 12 outputs one when the direct current voltage VPN exceeds the threshold V1 and then drops to or below the threshold V2.

An output value from the first hysteresis comparator 11 and an output value from the second hysteresis comparator 12 (each being zero or one) are inputted into the torque limit value calculator 13. The torque limit value calculator 13 outputs zero as the torque limit value TL when the output value of the first hysteresis comparator 11 is one and the output value of the second hysteresis comparator 12 is one. Moreover, the torque limit value calculator 13 outputs a first torque value TR (a value that does not allow the direct current voltage VPN to drop suddenly and is, for example, half the maximum torque TP of the motor M) as the torque limit value TL when the output value of the first hysteresis comparator 11 is one and the output value of the second hysteresis comparator 12 is zero. Moreover, the torque limit value calculator 13 outputs the second torque value TP (the maximum torque of the motor M) as the torque limit value TL when the output value of the first hysteresis comparator 11 is zero and the output value of the second hysteresis comparator 12 is zero.

The torque limiter 21 illustrated in FIG. 1 limits torque in a power running direction on the motor M based on the torque limit value TL outputted from the torque limit controller 10. Specifically, when the direct current voltage VPN drops to the threshold V2, the torque limiter 21 limits a torque command in the power running direction on the motor M to zero. The torque command is limited to zero to bring the d-axis current command IdC to zero. Hence, the field is weakened. As a result, an induced voltage Vi of the motor M rises. Consequently, the direct current voltage VPN rises. When the direct current voltage VPN rises from the threshold V2 to the threshold V1, the torque limiter 21 limits the torque in the power running direction on the motor M to the first torque value TR. In the torque limiter 21, only the torque in the power running direction is limited. This is because the direct current voltage VPN drops during the power running operation of the motor M. The direct current voltage VPN rises during regeneration of the motor M. Hence, there is no need to limit torque. Note that it is possible to determine which operation the motor M is performing, the power running operation or the regeneration operation, based on the torque command Tc and the polarity of the motor speed VFB.

Figure 5:
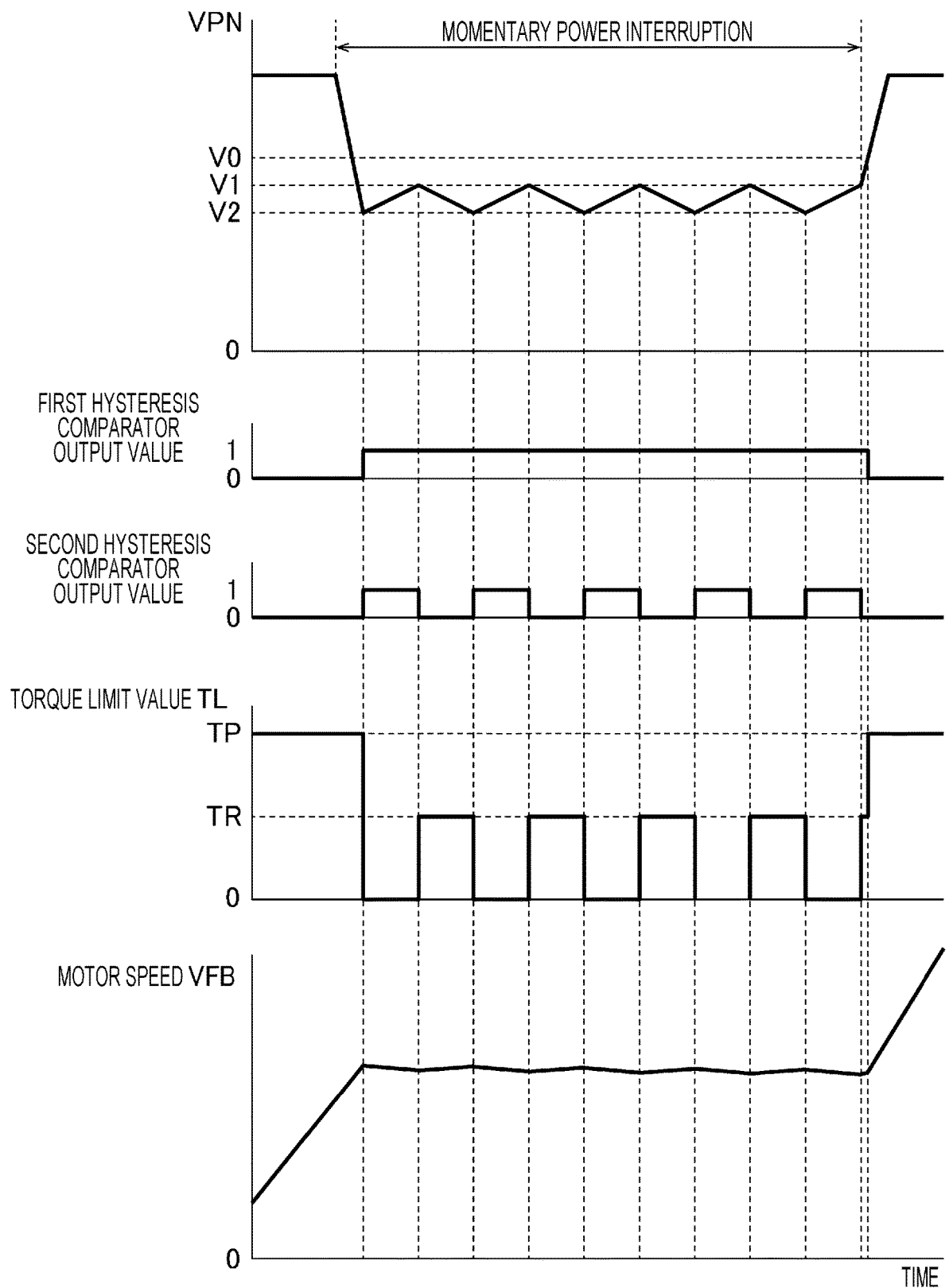
FIG. 5 is a graph explaining operation in a case where a momentary power interruption occurs during motor acceleration.

FIG. 5 is a graph explaining operation in a case where a momentary power interruption occurs during motor acceleration. The vertical axis indicates the direct current voltage VPN that is applied to the smoothing capacitor 3, the output value of the first hysteresis comparator 11, the output value of the second hysteresis comparator 12, the torque limit value TL, and the motor speed VFB, in the order from the top. The horizontal axis indicates time.

When a momentary power interruption occurs and the direct current voltage VPN drops to the threshold V2, the output value of the first hysteresis comparator 11 and the output value of the second hysteresis comparator 12 both become one. Hence, the torque limit value TL becomes one. As a result, the torque command Tc in the power running direction is limited to zero.

When the torque command Tc in the power running direction is limited to zero, the motor M enters a free-running state. The motor speed VFB then drops gradually. Moreover, the torque limit value TL is brought to zero to bring the d-axis current command IdC to zero. As a result, the field is weakened. Hence, the induced voltage Vi of the motor M increases. As a result, the direct current voltage VPN rises.

Next, when the direct current voltage VPN exceeds the threshold V1, the output value of the first hysteresis comparator 11 is one. On the other hand, the output value of the second hysteresis comparator 12 is zero. Hence, the torque limit value TL is mitigated to the first torque value TR. Hence, the motor M accelerates, so that the direct current voltage VPN drops.

Next, when the direct current voltage VPN drops again to the threshold V2, the output value of the first hysteresis comparator 11 and the output value of the second hysteresis comparator 12 both become one. Hence, the torque limit value TL becomes zero. As a result, the torque command Tc in the power running direction is limited to zero.

After that, while the momentary power interruption continues, the rise and drop of the direct current voltage VPN is repeated as described above. When the momentary power interruption ends, the direct current voltage VPN rises. When the direct current voltage VPN exceeds the threshold V0, then the output value of the first hysteresis comparator 11 and the output value of the second hysteresis comparator 12 both become zero. Hence, the torque limit value TL is mitigated to the second torque value TP being the maximum torque of the motor M. As a result, the motor M is returned to its normal operation.

Note that all the torque limits described above are torque limits in the power running direction. A torque limit in a regenerative direction has not been described. Moreover, the torque limit value TL in the case where the output value of the first hysteresis comparator 11 and the output value of the second hysteresis comparator 12 are both one is not limited to zero. In this case, the torque limit value TL may be a small value. In this case, the motor M accelerates slightly, so that a drop in the direct current voltage VPN is expected. However, the ratio of a rise of the direct current voltage VPN due to the weakening of the field can be set to be greater than the ratio of a drop of the direct current voltage VPN due to the acceleration of the motor M. Hence, such a setting allows the direct current voltage VPN as a whole to rise.

From the above description, it is possible to suppress a drop in the direct current voltage with a small amount of reduction in the motor speed and avoid the occurrence of an anomaly. Consequently, it is possible to shorten the extension of the acceleration time due to a momentary power interruption.

Second Embodiment

Figure 6:
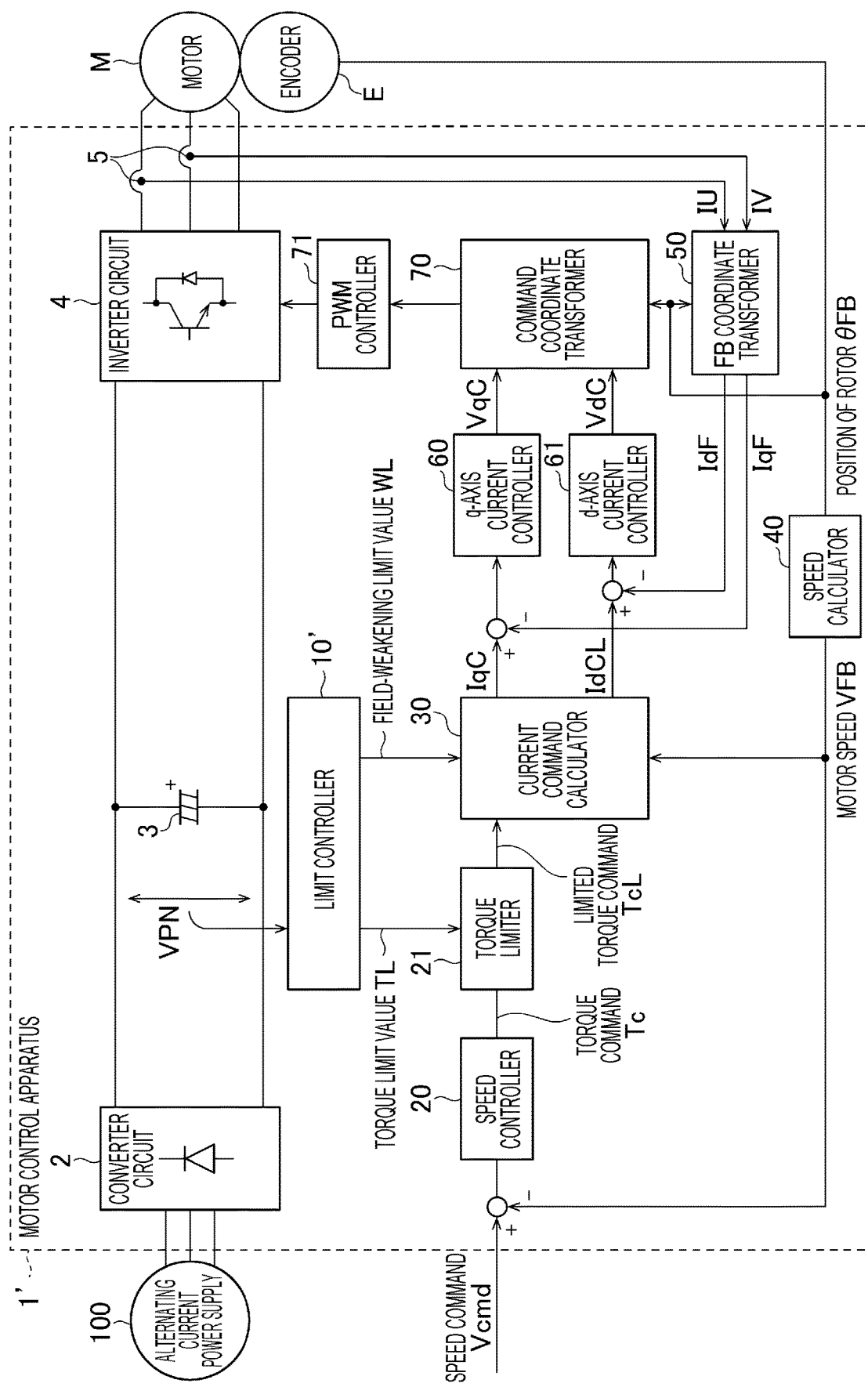
FIG. 6 is a block diagram of a motor control apparatus according to a second embodiment of the present disclosure.

FIG. 6 is a block diagram of a motor control apparatus 1' according to a second embodiment of the present disclosure. As illustrated in FIG. 6, the motor control apparatus 1' includes a converter circuit 2, a smoothing capacitor 3, and an inverter circuit 4. Moreover, the motor control apparatus 1' includes a limit controller 10', a speed controller 20, a torque limiter 21, a current command calculator 30, a speed calculator 40, a current detector 5, a feedback coordinate transformer 50, a q-axis current controller 60, a d-axis current controller 61, a command coordinate transformer 70, and a PWM controller 71. In the configuration of the motor control apparatus 1' according to the second embodiment, the torque limit controller 10 is replaced with the limit controller 10' in a comparison between the block diagram of the motor control apparatus 1 according to the first embodiment, which is illustrated in FIG. 1, and the block diagram of the motor control apparatus 1' according to the second embodiment, which is illustrated in FIG. 6.

A direct current voltage VPN that is applied to the smoothing capacitor 3 is inputted into the limit controller 10'. The limit controller 10' calculates and outputs a torque limit value TL and a field-weakening limit value WL. A method for calculating the torque limit value TL and the field-weakening limit value WL is described below.

A torque command Tc from the speed controller 20 and the torque limit value TL from the limit controller 10' are inputted into the torque limiter 21. The torque limiter 21 calculates and outputs a torque-limited torque command TcL.

The torque-limited torque command TcL from the torque limiter 21 and the field-weakening limit value WL from the limit controller 10' are inputted into the current command calculator 30. The current command calculator 30 calculates and outputs a q-axis current command IqC and a limited d-axis current command IdCL.

The other configurations (the converter circuit 2, the smoothing capacitor 3, the inverter circuit 4, the current detector 5, an encoder E, the speed controller 20, the q-axis current controller 60, the d-axis current controller 61, the feedback coordinate transformer 50, the command coordinate transformer 70, and the PWM controller 71) are similar to those of the motor control apparatus 1 according to the first embodiment, which is illustrated in FIG. 1, and therefore, descriptions thereof are omitted.

Figure 7:
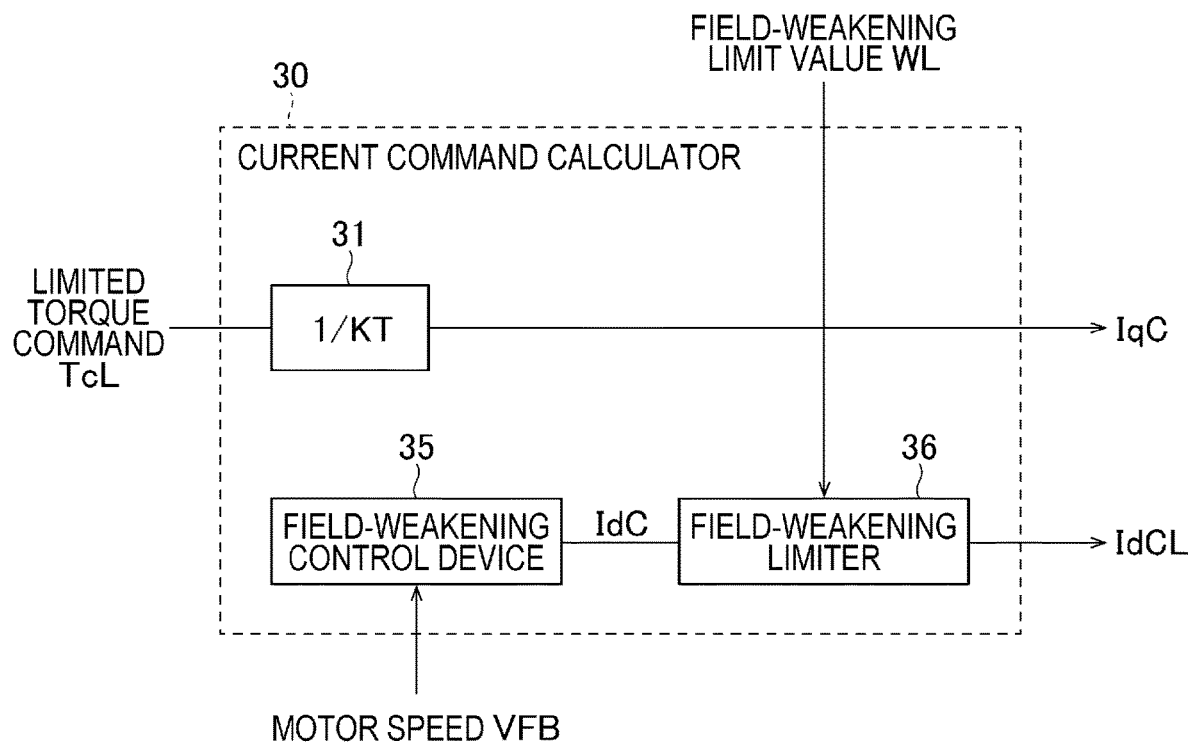
FIG. 7 is a block diagram of a current command calculator that is used in the second embodiment of the present disclosure.

FIG. 7 is a block diagram of the current command calculator 30 that is used in the second embodiment of the present disclosure. As illustrated in FIG. 7, the current command calculator 30 includes a torque constant divider 31, a field-weakening control device 35, and a field-weakening limiter 36.

The torque limiter 21 inputs the torque-limited torque command TcL into the torque constant divider 31. The torque constant divider 31 divides the limited torque command TcL by a torque constant TK to calculate and output the q-axis current command IqC.

A motor speed VFB is inputted into the field-weakening control device 35. The field-weakening control device 35 calculates a d-axis current command IdC. The d-axis current command IdC from the field-weakening control device 35 and the field-weakening limit value WL from the limit controller 10' are inputted into the field-weakening limiter 36. The field-weakening limiter 36 calculates and outputs the limited d-axis current command IdCL.

Figure 8:
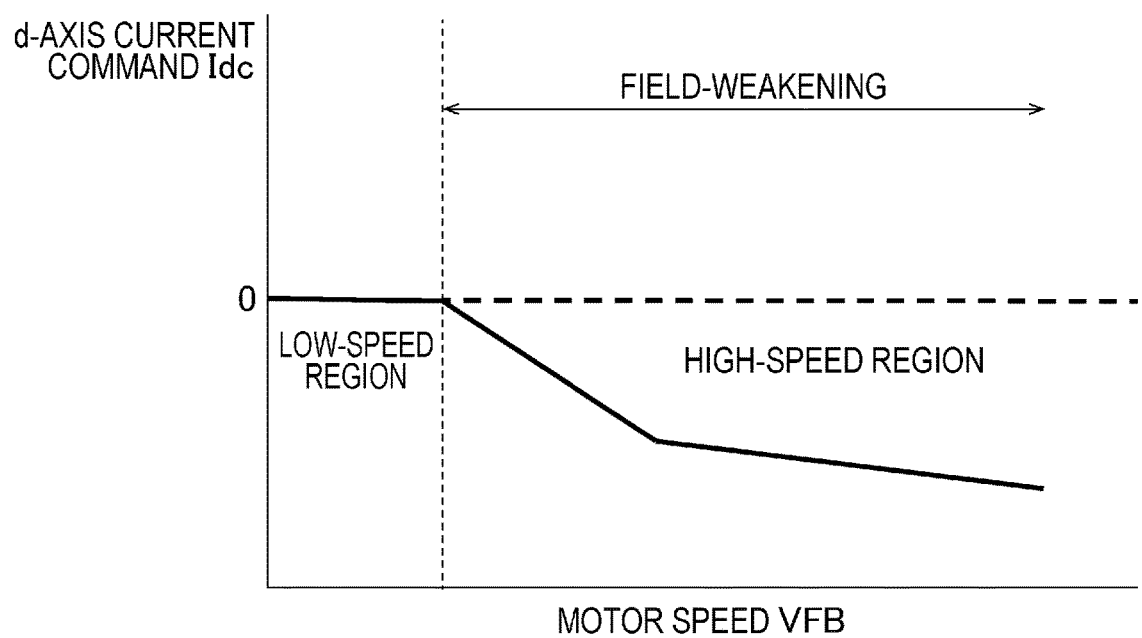
FIG. 8 is a graph illustrating a relationship between a motor speed and a d-axis current command.

FIG. 8 is a graph illustrating a relationship between the motor speed VFB and the d-axis current command IdC. The vertical axis indicates the d-axis current command IdC. The horizontal axis indicates the motor speed VFB. As illustrated in FIG. 8, in a low-speed region of the motor speed VFB, the d-axis current command IdC is adjusted to zero to obtain a second torque value TP being the maximum torque of a motor M. Moreover, in a high-speed region of the motor speed VFB, the d-axis current command IdC is set at a negative value in accordance with the motor speed VFB in such a manner that the motor voltage to be applied to the motor M is equal to or less than the output voltage of the inverter circuit 4. As a result, field-weakening control is implemented.

Figure 9:
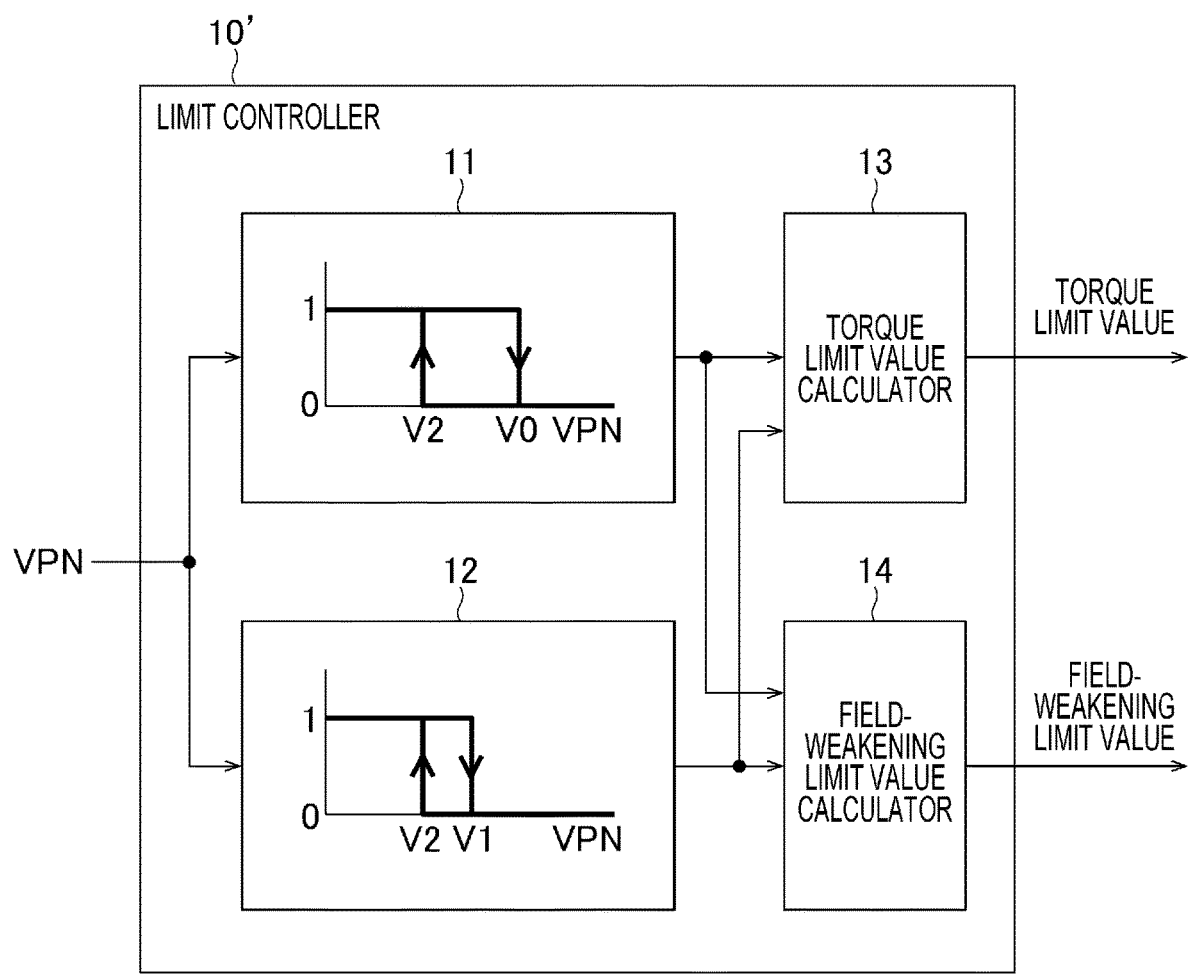
FIG. 9 is a block diagram of a torque limit controller that is used in the second embodiment of the present disclosure.

FIG. 9 is a block diagram of the limit controller 10' that is used in the second embodiment of the present disclosure. The internal configuration of the limit controller 10' and the method for calculating the torque limit value TL are described by use of FIG. 9. Note that in the configuration of the limit controller 10' that is used in the second embodiment, a field-weakening limit value calculator 14 is added in a comparison between the block diagram of the torque limit controller 10 that is used in the first embodiment, which is illustrated in FIG. 4, and the block diagram of the limit controller 10' that is used in the second embodiment, which is illustrated in FIG. 9.

The limit controller 10' includes a first hysteresis comparator 11, a second hysteresis comparator 12, a torque limit value calculator 13, and a field-weakening limit value calculator 14.

Output values (each being zero or one) from the first hysteresis comparator 11 and the second hysteresis comparator 12 are inputted into the torque limit value calculator 13 and the field-weakening limit value calculator 14. When the output value of the first hysteresis comparator 11 is one and the output value of the second hysteresis comparator 12 is one, the torque limit value calculator 13 outputs zero as the torque limit value TL. The field-weakening limit value calculator 14 then outputs zero as the field-weakening limit value WL. Moreover, when the output value of the first hysteresis comparator 11 is one and the output value of the second hysteresis comparator 12 is zero, the torque limit value calculator 13 outputs a first torque value TR (a value that does not allow the direct current voltage VPN to drop suddenly and is, for example, half the maximum torque TP of the motor M) as the torque limit value TL. The field-weakening limit value calculator 14 outputs a first field-weakening value ($\frac{1}{2}$) as the field-weakening limit value WL. Moreover, when the output value of the first hysteresis comparator 11 is zero and the output value of the second hysteresis comparator 12 is zero, the torque limit value calculator 13 outputs the second torque value TP (the maximum torque of the motor M) as the torque limit value TL. The field-weakening limit value calculator 14 outputs a second field-weakening value (a value that has no field-weakening limit and is one) as the field-weakening limit value WL.

The other configurations (the first hysteresis comparator 11 and the second hysteresis comparator 12) are similar to those of the torque limit controller 10 that is used in the first embodiment, which is illustrated in FIG. 4, and therefore, descriptions thereof are omitted.

Figure 10:
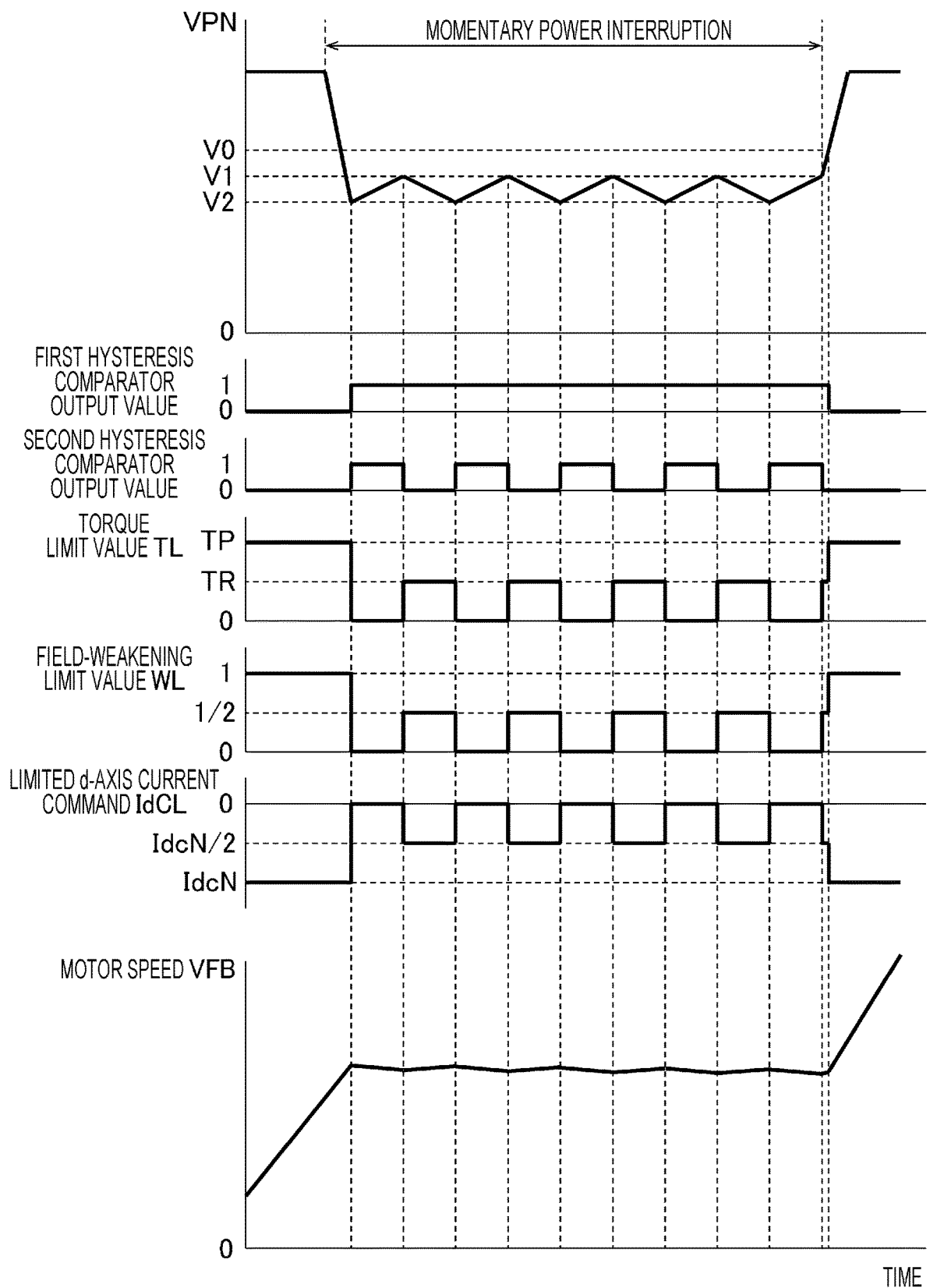
FIG. 10 is a graph explaining operation in a case where a momentary power interruption occurs during motor acceleration.

FIG. 10 is a graph explaining operation in a case where a momentary power interruption occurs during motor acceleration. The vertical axis indicates the direct current voltage VPN that is applied to the smoothing capacitor 3, the output value of the first hysteresis comparator 11, the output value of the second hysteresis comparator 12, the torque limit value TL, the field-weakening limit value WL, the limited d-axis current command IdCL, and the motor speed VFB, in the order from the top. The horizontal axis indicates time.

When a momentary power interruption occurs and the direct current voltage VPN drops to the threshold V2, the output value of the first hysteresis comparator 11 and the output value of the second hysteresis comparator 12 both become one. Hence, the torque limit value TL becomes zero. As a result, the torque command Tc in the power running direction is limited to zero. Moreover, the field-weakening limit value WL also becomes zero. As a result, the d-axis current command IdC is limited to zero.

When the torque command Tc in the power running direction is limited to zero, the motor M enters a free-running state. The motor speed VFB then drops gradually. Moreover, the d-axis current command IdC is limited to zero to weaken the field. Hence, an induced voltage Vi of the motor M increases. As a result, the direct current voltage VPN rises.

Next, when the direct current voltage VPN exceeds the threshold V1, the output value of the first hysteresis comparator 11 is one. On the other hand, the output value of the second hysteresis comparator 12 is zero. Hence, the torque limit value TL is mitigated to the first torque value TR. As a result, the field-weakening limit value WL is mitigated to the first field-weakening value ($\frac{1}{2}$). Hence, the limited d-axis current command IdCL is mitigated to a first current command value (half a second current command value IdCN). Hence, the motor M accelerates, so that the direct current voltage VPN drops.

Next, when the direct current voltage VPN drops again to the threshold V2, the output value of the first hysteresis comparator 11 and the output value of the second hysteresis comparator 12 both become one. Hence, the torque limit value TL becomes zero. As a result, the torque command Tc in the power running direction is limited to zero.

After that, while the momentary power interruption continues, the rise and drop of the direct current voltage VPN is repeated as described above. When the momentary power interruption ends, the direct current voltage VPN rises. When the direct current voltage VPN exceeds the threshold V0, then the output value of the first hysteresis comparator 11 and the output value of the second hysteresis comparator 12 both become zero. Hence, the torque limit value TL is mitigated to the second torque value TP being the maximum torque of the motor M. As a result, the field-weakening limit value WL is mitigated to the second field-weakening value (the value that has no field-weakening limit and is one). At this point in time, the limited d-axis current command IdCL is mitigated to the second current command value (IdCN). As a result, the motor M is returned to its normal operation.

Note that all the torque limits described above are torque limits in the power running direction. A torque limit in a regenerative direction has not been described. Moreover, the torque limit value TL in the case where the output value of the first hysteresis comparator 11 and the output value of the second hysteresis comparator 12 are both one is not limited to zero. In this case, the torque limit value TL may be a small value. Similarly, the field-weakening limit value WL is not limited to zero, either, and may be a small value. Furthermore, the torque limit value TL in the case where the output value of the first hysteresis comparator 11 is one and the output value of the second hysteresis comparator 12 is zero is not limited to the first torque value TR. The torque limit value TL may be a value obtained by adding or subtracting a small value to or from the first torque value TR. Similarly, the field-weakening limit value WL is not limited to the first field-weakening value (½). The field-weakening limit value WL may be a value obtained by adding or subtracting a small value to or from the first field-weakening value (½).

From the above description, it is possible to suppress a drop in the direct current voltage with a small amount of reduction in the motor speed and avoid the occurrence of an anomaly. Consequently, it is possible to shorten the extension of the acceleration time due to a momentary power interruption.

Up to this point the embodiments have been described. However, it is needless to say that the technical scope of the embodiments should not be construed in a limited manner by the above-mentioned detailed description. The above-mentioned embodiments are mere examples. Those skilled in the art understand that the above-mentioned embodiments can be modified in various manners within the scope described in the claims. The technical scope of the embodiments should be determined on the basis of the scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor control apparatus comprising:
a converter circuit;
a smoothing capacitor;
an inverter circuit;
a torque limiter; and
a field-weakening control device, wherein
the converter circuit is configured to convert alternating current power from an alternating current power supply to direct current power,
the smoothing capacitor is configured to smooth the direct current power,
the inverter circuit is configured to convert the smoothed direct current power to alternating current power for driving a motor,
the torque limiter is configured to limit torque on the motor based on a torque limit value calculated from a direct current voltage to be applied to the smoothing capacitor,
the torque limiter is configured to limit torque in a power running direction on the motor to a first torque value upon the direct current voltage dropping to a first threshold,
the field-weakening control device is configured to weaken a field and raise an induced voltage of the motor to raise the direct current voltage upon the torque in the power running direction being limited to the first torque value, and
the torque limiter is configured to limit the torque in the power running direction on the motor to a second torque value greater than the first torque value upon the direct current voltage rising from the first threshold to a second threshold greater than the first threshold.

2. The motor control apparatus according to claim 1, further comprising:
a torque limit controller configured to calculate the torque limit value, wherein
the torque limit controller includes a plurality of hysteresis comparators having different thresholds, and
the torque limit controller is configured to calculate the torque limit value based on outputs from the plurality of hysteresis comparators into which the direct current voltage has been inputted.

3. The motor control apparatus according to claim 2, wherein the motor control apparatus is configured to control the motor based on a speed command for the motor, and the torque limit value calculated by the torque limit controller.

4. The motor control apparatus according to claim 2, wherein
a current command is calculated based on a speed command for the motor and the torque limit value calculated by the torque limit controller, and
a d-axis current command and a q-axis current command are calculated based on the current command and an electric angle between a d-axis and the current command, the electric angle being calculated by the field-weakening control device.

5. A motor control apparatus comprising:
a converter circuit;
a smoothing capacitor;
an inverter circuit;
a torque limiter; and
a field-weakening limiter, wherein the converter circuit is configured to convert alternating current power from an alternating current power supply to direct current power, the smoothing capacitor is configured to smooth the direct current power, the inverter circuit is configured to convert the smoothed direct current power to alternating current power for driving a motor, the torque limiter is configured to limit torque on the motor based on a direct current voltage to be applied to the smoothing capacitor, the field-weakening limiter is configured to limit field-weakening based on the direct current voltage to be applied to the smoothing capacitor, the torque limiter is configured to limit torque in a power running direction on the motor to a first torque value upon the direct current voltage dropping to a first threshold, the field-weakening limiter is configured to limit the field-weakening to a first field-weakening value and raise an induced voltage of the motor to raise the direct current voltage upon the direct current voltage dropping to the first threshold, the torque limiter is configured to limit the torque in the power running direction on the motor to a second torque value greater than the first torque value upon the direct current voltage rising from the first threshold to a second threshold greater than the first threshold, and the field-weakening limiter is configured to limit the field-weakening to a second field-weakening value greater than the first field-weakening value upon the direct current voltage rising from the first threshold to the second threshold greater than the first threshold.

6. The motor control apparatus according to claim 5, further comprising:

a limit controller configured to calculate a torque limit value and a field-weakening limit value, wherein the limit controller includes a plurality of hysteresis comparators having different thresholds, and the limit controller is configured to calculate the torque limit value and the field-weakening limit value based on outputs from the plurality of hysteresis comparators into which the direct current voltage has been inputted.

7. The motor control apparatus according to claim 6, wherein the motor control apparatus is configured to control the motor based on a speed command for the motor, and the torque limit value and the field-weakening limit value that are calculated by the limit controller.

8. The motor control apparatus according to claim 6, wherein a q-axis current command is calculated based on a speed command for the motor and the torque limit value calculated by the limit controller, and a limited d-axis current command is calculated based on a d-axis current command calculated by a field-weakening control device, and the field-weakening limit value.

* * * * *